April 3, 1934. H. KRUM ET AL Re. 19,127
FRUIT SLICING MACHINE
Original Filed Feb. 28, 1931 4 Sheets-Sheet 1
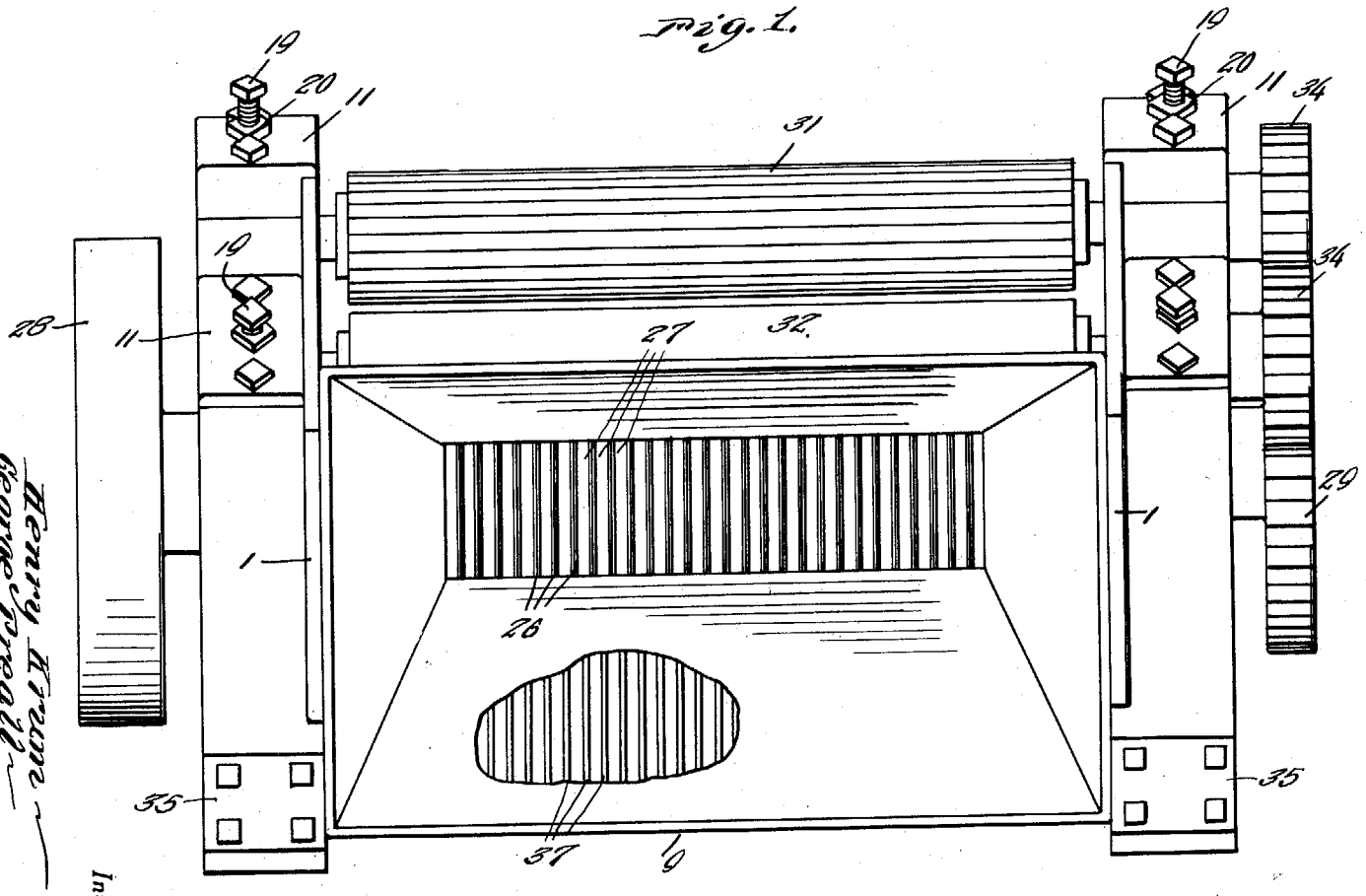
Inventors
Henry Krum
George Preall
James H. Chambers
By Clarence A. O'Brien
Attorney April 3, 1934. H. KRUM ET AL Re. 19,127

FRUIT SLICING MACHINE

Original Filed Feb. 28, 1931 4 Sheets-Sheet 2

Inventors

Henry Krum

George Preall

James H. Chambers

By Clarence A. O'Brien

Attorney

April 3, 1934. H. KRUM ET AL Re. 19,127
FRUIT SLICING MACHINE
Original Filed Feb. 28, 1931 4 Sheets-Sheet 3
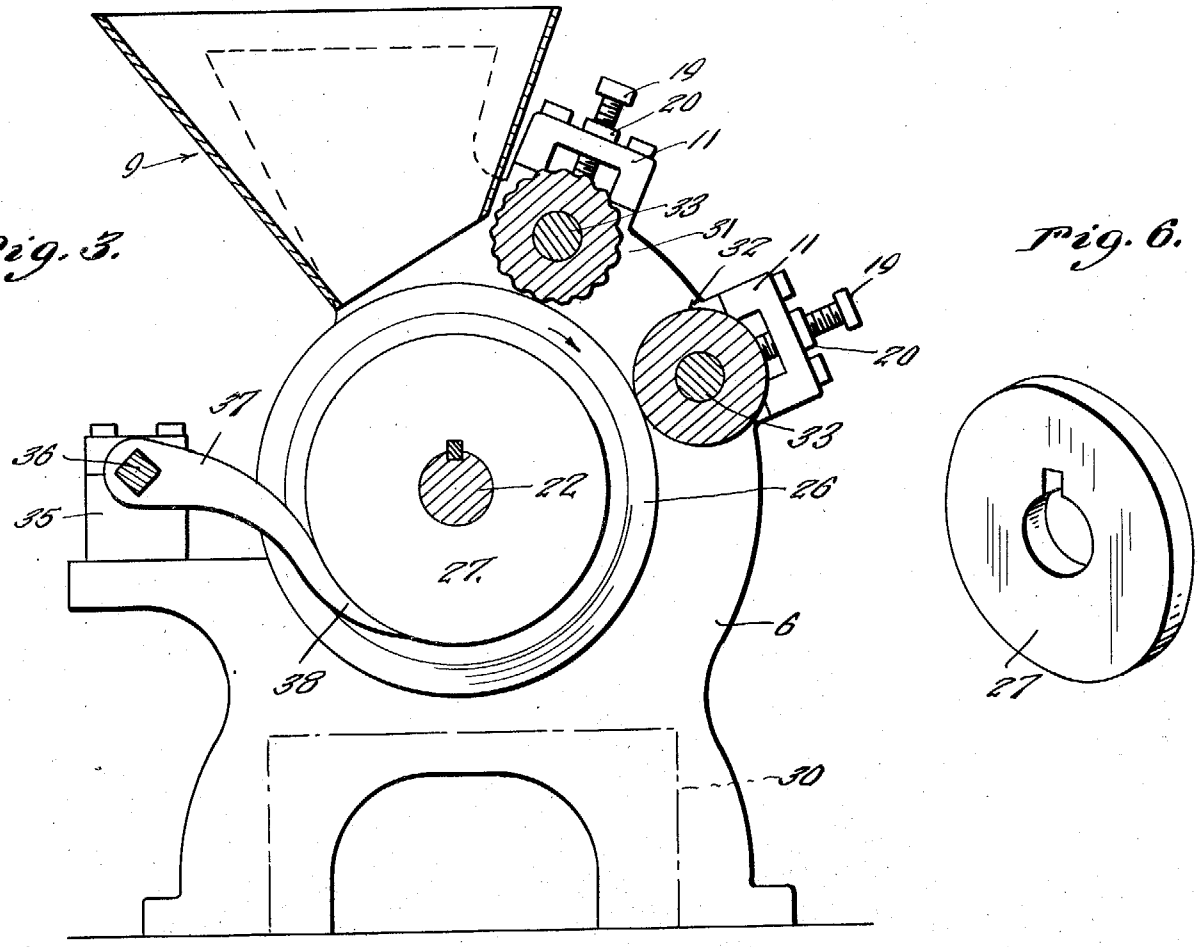
Inventor
Henry Krum
George Preall
James H. Chambers
By Clarence O'Brien
Attorney April 3, 1934. H. KRUM ET AL Re. 19,127

FRUIT SLICING MACHINE

Original Filed Feb. 28, 1931 4 Sheets-Sheet 4

Inventors
Henry Krum
George Preall
James H. Chambers
By Clarence A. O'Brien
Attorney Reissued Apr. 3, 1934

Re. 19,127

UNITED STATES PATENT OFFICE 19,127

FRUIT SLICING MACHINE

Henry Krum, George Preall, and James Henry Chambers, Fresno, Calif., assignors to said James Henry Chambers Original No. 1,914,860, dated June 20, 1933, Serial No. 519,166, February 28, 1931. Application for reissue January 10, 1934, Serial No. 706,154

2 Claims. (Cl. 146—98)

This invention relates to an improved machine which is especially but not necessarily adapted for slicing fruit into relatively small fragments to expedite conditioning for the market.

The machine was primarily designed with a view toward providing a practical structure for reducing figs to comparatively small pieces to expedite subsequent washing, inspection, and packaging for the commercial trade, and to thereby render the product more suitable for expeditious employment in bakeries and the like.

Briefly stated, the improved machine comprises a frame provided with a suitable delivery hopper beneath which is a rotary bladed slicing device and adjacent to which are pressing and feeding rollers to facilitate cutting of the fruit into small pieces for the aforesaid purposes.

The specific structural details and their relative arrangement and association thereof will become more readily apparent from the following description and drawings:

In the drawings:

Figure 1 is a top plan view of a machine constructed in accordance with the present invention.

Figure 2 is an end view thereof observing the same in a direction from right to left in Figure 1.

Figure 3 is a central vertical sectional view.

The frame comprises a casting including a pair of longitudinally spaced parallel perpendicular legs 6 whose upper portions are formed into extensions 7 having inturned bevelled supporting lugs 8 between which the hopper 9 is removably suspended.

Figures 5, 6:
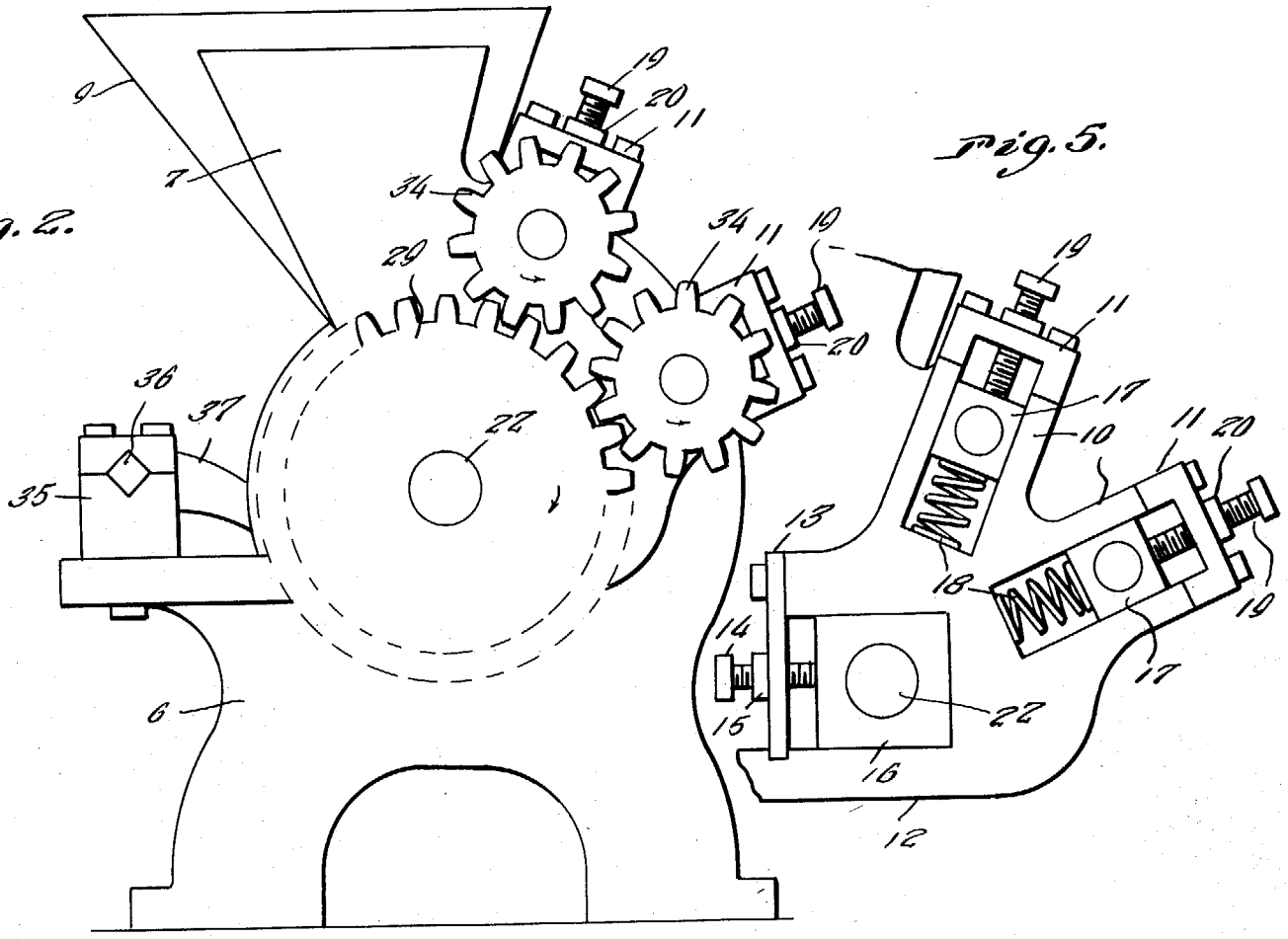
Figure 5 is a fragmentary end view of a portion of the framework.
Figure 6 is a perspective view of one of the knife spacers.

Each leg structure is provided with a multiplicity of bearing retaining guides as shown in Figure 5. For instance, the numerals 10 designate duplicate outwardly diverging guides having removable U-shaped caps 11. The numeral 12 represents a horizontal bifurcated guide having a removable end plate 13 detachably bolted in place as shown.

Carried by this plate 13 is a set screw 14 having a lock nut 15, said set screw serving to hold the bearing block 16 in place. Similar and smaller bearing blocks 17 are supported in the guides 10 and are resiliently supported by the expansion coiled springs 18.

In addition however, we provide set bolts 19 mounted on the adjacent caps 11, and held in adjusted position by lock nuts 20. These screws 19 bear against the bearing blocks 17.

Figure 4:
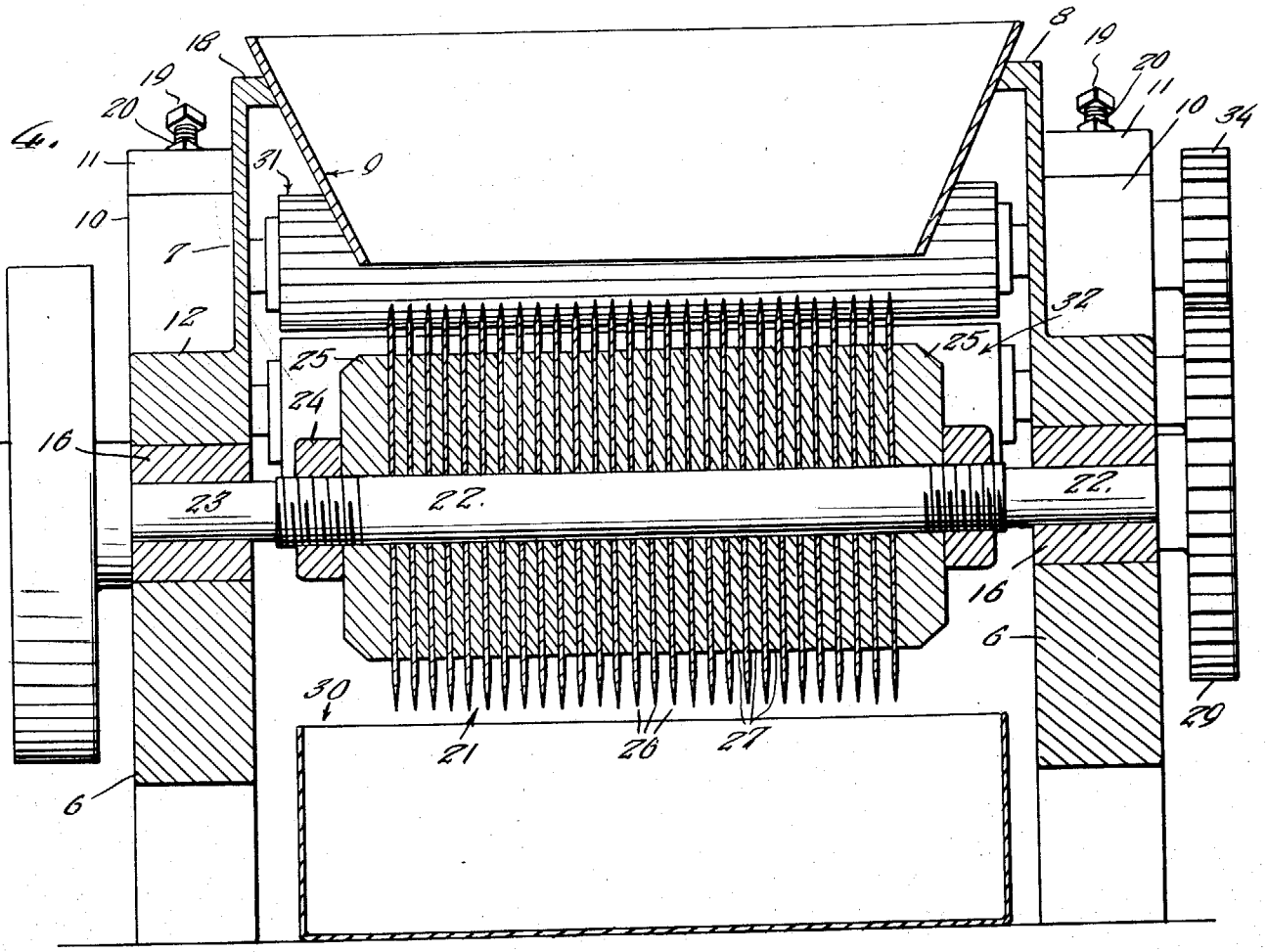
Figure 4 is a longitudinal sectional view.

We next call attention to Figure 4, wherein the rotating cutter 21 is shown in detail. This comprises a shaft 22 having its end portions 23 formed into trunnions journalled in the aforesaid bearing blocks 16.

Mounted on the threaded portions are retaining nuts 24 for end thrust washers 25 and assembled between these washers are the longitudinally spaced feather-edged cutting discs 26 and the intervening spacing rings 27.

On one trunnion 23 on the left in Figure 4 is a power pulley 28, and on the opposite end is a propulsion gear 29. Located beneath the cutter is a removable collection receptacle or box 30 which receives the cuttings.

We now call attention to Figure 3, wherein it will be seen that the numeral 31 designates a corrugated feeding roller which is designated as the upper roller. The numeral 32 indicates the lower roller and this preferably has a smooth surface.

The central core-forming shafts 33 of these rollers are mounted for rotation in the aforesaid spring supported bearing blocks 17 as shown in Figure 5. At the right hand end on these shafts are pinions 34 which are in synchronous mesh with the large driving gear 29. Thus, the rollers 31 and 32 are driven positively and rotate with the cutter.

The rollers 31 and 32 however travel in a reverse direction from that of the cutting discs. The rollers are resiliently supported by the springs 18 and are adjusted relative to the knives by the bolts 19.

The function of the rollers 31 and 32 is to force feed the fruit from the hopper into engagement with the cutting edges of the discs to prevent retrograde action of the fruit, whereby to subject it to the keen cutting action of the discs.

The important feature of the invention is the fact that the feed roller 31 is disposed closely adjacent the cutting elements 26 and in no event is the distance between the feed roller and the cutting element greater than the diameter of the figs to be fed therebetween. Thus, no figs can pass between the roller and cutting element without immediate initial slicing cuts being made into the figs, since as the soft dried figs are dropped down from the hopper 9, the individual figs are at once contacted by the roller 31 and pressed into the adjacent cutting discs 26. The figs then continue to be impaled on the cutting discs until brought into contact with the pressure roller 32 which presses the figs onto the cutting discs to complete the slicing action. The prime objective of the invention is to cut the dried figs into thin uniform slices so they may be laid out in unbroken relation for inspection purposes. They must not therefore be hashed, chopped or ground up. The specific arrangement and relationship of the feed roller to the cutting disc and the operation thereof as indicated is therefore very essential to the carrying out of this objective.

We also call attention to the means provided for cleaning—that is, clearing the accumulated fruit and deposit from the peripheral portion of the spacing rings 27. It will be observed for instance in Figure 3 that posts 35 are supported on the end frames and constructed to hold in place a removable polygonal horizontally disposed shaft 36.

This shaft constitutes a carrier for a multiplicity of scraping fingers 37 whose free end portions 38 are shaped to contact the relatively movable rings 27.

In practice, the hopper 9 is placed between the end frames, that is, directly between the supporting lugs 8 as shown in Figure 4, and is filled with ordinary fruit for example, figs.

The figs drop down on the rotating discs 26 of the rotary cutter 21 and are carried around in the direction of the arrow indicated in Figure 3, being held in contact with the cutting edges of the discs by the positively driven simultaneously rotatable feed and crushing rollers 31 and 32.

These rollers operate in conjunction and successively to produce the desired pressing and cutting action and also to prevent retrograde displacement of the fruit by insuring continuous movement thereof. Then too, this cooperation of positively driven reversely acting rollers 31 and 32 in conjunction with the rotary cutter avoids clogging and provides for prompt and smooth severing.

The severed pieces of fruit drop by gravity down into the collection receptacle or box 30 and the particles which adhere to the periphery of the spacing rings 27 are scraped off by the fingers 37 to drop down into the same receptacle. Consequently all of the parts cooperate in coherent, mechanical relationship to accomplish the desired results in an expeditious and desirable manner.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

1. A fig slicing machine comprising a set of slicing discs, means to feed figs adjacent the discs, a feed roller disposed adjacent the discs and spaced therefrom a distance less than any diameter of the figs whereby as the roller feeds the figs to the discs it will press the figs against the discs to effect initial slicing cuts into the figs, means cooperating with the discs to effect a final slicing of the same; the figs remaining impaled on the discs in such partially sliced position until they move into engagement with such cooperating means.

2. A slicing machine of the class described comprising a frame, a horizontally arranged shaft journalled in the frame, a plurality of spaced cutting discs carried by the shaft, a hopper supported in the frame and located above the discs for feeding material upon the discs, a longitudinally corrugated roller supported in the frame for rotary movement adjacent the discharge side of the hopper, for pressing the material upon the discs, a smooth cylindrical roller supported in the frame and located below the horizontal plane of the first roller for pressing material upon the discs, said rollers being located adjacent the discs, means for rotating the disc carrying shaft in a direction to carry the material from the hopper towards the corrugated roller, and means for rotating the corrugated roller and the smooth roller from the disc carrying shaft and in a direction opposite to the direction of rotation of the disc carrying shaft.

HENRY KRUM.
GEORGE PREALL.
JAMES HENRY CHAMBERS.